United States Patent
Granger

(10) Patent No.: US 11,053,120 B2
(45) Date of Patent: Jul. 6, 2021

(54) REACTOR FOR OXIDATION OF AMMONIA IN THE PRODUCTION OF NITRIC ACID

(71) Applicant: Casale SA, Lugano (CH)

(72) Inventor: Jean François Granger, Lugano (CH)

(73) Assignee: Casale SA, Lugano (CH)

( * ) Notice: Subject to any disclaimer, the term of this patent is extended or adjusted under 35 U.S.C. 154(b) by 0 days.

(21) Appl. No.: 16/074,543

(22) PCT Filed: Sep. 7, 2016

(86) PCT No.: PCT/EP2016/071086
§ 371 (c)(1),
(2) Date: Aug. 1, 2018

(87) PCT Pub. No.: WO2017/144127
PCT Pub. Date: Aug. 31, 2017

(65) Prior Publication Data
US 2019/0039892 A1   Feb. 7, 2019

(30) Foreign Application Priority Data

Feb. 24, 2016   (EP) ...................... 16157064

(51) Int. Cl.
| | | |
|---|---|---|
| *C01B 21/38* | (2006.01) | |
| *C01B 21/26* | (2006.01) | |
| *C01B 21/28* | (2006.01) | |
| *B01J 12/00* | (2006.01) | |
| *B01J 19/00* | (2006.01) | |
| *B01J 23/46* | (2006.01) | |
| *B01J 35/06* | (2006.01) | |

(52) U.S. Cl.
CPC ............ *C01B 21/38* (2013.01); *B01J 12/007* (2013.01); *B01J 19/0013* (2013.01); *B01J 23/464* (2013.01); *B01J 35/06* (2013.01); *C01B 21/26* (2013.01); *C01B 21/265* (2013.01); *C01B 21/28* (2013.01); *B01J 2219/00051* (2013.01); *B01J 2219/00186* (2013.01); *Y02P 20/129* (2015.11)

(58) Field of Classification Search
CPC ............................... C01B 21/38; B01J 12/007
See application file for complete search history.

(56) References Cited

U.S. PATENT DOCUMENTS

| | | | | |
|---|---|---|---|---|
| 7,374,942 B2 * | 5/2008 | Klein | ................... | B01J 19/0046 250/282 |
| 8,097,226 B2 * | 1/2012 | Yi | ........................ | B01J 19/0046 422/129 |

FOREIGN PATENT DOCUMENTS

| | | |
|---|---|---|
| DE | 10 2013 004 341 A1 | 9/2014 |
| RU | 2114056 C1 | 6/1998 |
| RU | 2174946 C1 | 10/2001 |
| SU | 571051 A1 | 9/1982 |
| WO | 2004/096702 A2 | 11/2004 |
| WO | 2009/054728 A1 | 4/2009 |
| WO | 2012/138766 A2 | 10/2012 |
| WO | 2014/114764 A1 | 7/2014 |

OTHER PUBLICATIONS

International Search Report issued in connection with PCT/EP2016/071086.

* cited by examiner

*Primary Examiner* — Stuart L Hendrickson
(74) *Attorney, Agent, or Firm* — Akerman LLP

(57) ABSTRACT

A method for the production of nitric acid, comprising a step of oxidation of ammonia in the presence of a catalyst, comprising a step of monitoring the temperature of said catalyst by at least one contactless infrared sensor.

7 Claims, 2 Drawing Sheets

REACTOR FOR OXIDATION OF AMMONIA IN THE PRODUCTION OF NITRIC ACID

This application is a national phase of PCT/EP2016/071086, filed Sep. 7, 2016, and claims priority to EP 16157064.3, filed Feb. 24, 2016, the entire contents of both of which are hereby incorporated by reference.

FIELD OF THE INVENTION

The invention relates to the field of industrial production of nitric acid.

PRIOR ART

The production of nitric acid involves basically: a first step of oxidation of gaseous ammonia with air, over a suitable catalyst, obtaining a gaseous product containing NOx and $N_2O$ (nitrous oxide); a second step of contacting said gaseous product with water, to absorb the above mentioned oxides and obtain $HNO_3$.

The first step of oxidation of ammonia is usually carried out under pressure, in a suitable vessel which is also called burner or combustion reactor. The catalyst is typically a gauze pack of Platinum-Rhodium (Pt—Rh) which is supported by a basket inside said reactor. The basket may contain an amount of Rashig rings (to enhance contact between the gaseous components) or, when required, a secondary catalyst for $N_2O$ abatement, beneath the Pt—Rh gauze.

In operation, said Pt—Rh catalyst reaches a high temperature (900 to 1000° C.). Heat exchange elements are arranged around the catalytic basket, to recover reaction heat by transfer to a suitable medium. Typically, said elements are tubes of a waste heat boiler to produce steam.

An accurate measure of the temperature of the catalyst is required in order to optimize the conversion of $NH_3$ and to promptly detect any local deviation which may cause safety risks. A deviation of the optimal temperature may result in a poor oxidation of ammonia or in the production of an explosive mixture.

According to the prior art, the temperature of the Pt—Rh catalyst is monitored by a set of temperature probes (usually 3 to 6), each probe being mounted in a respective thermowell.

A thermowell is basically a tubular fitting to protect the temperature probe. As the temperature probe must be close to the Pt—Rh catalyst, in order to provide a reliable measure, the thermowell must be an elongated body and must pass through several items: the shell of the reactor, the tubes of the waste-heat boiler, the basket and the mass of Rashig rings or secondary catalyst within the basket.

As a consequence, the installation of said probes and the related thermowells is difficult and expensive; furthermore the accuracy and reliability are not satisfactory. The wells are exposed to hot temperature (about 900° C.) and can be affected by corrosion due to NOx condensing to $HNO_3$, especially during shutdown. Replacement of the thermowells requires a prolonged stop of the plant. Furthermore, a retrofitting of a combustion reactor by installation of one or more additional temperature probe(s) is quite difficult, since any newly-installed thermowells would require a passage through the pressure vessel and, in most cases, adding an aperture to the pressure vessel requires a new pressure testing.

SUMMARY OF THE INVENTION

The aim of the invention is to solve the above drawbacks of the prior art.

The aim is reached with a method for the production of nitric acid, comprising a step of oxidation of ammonia in the presence of a catalyst, characterized by comprising the step of monitoring the temperature of said catalyst by at least one contactless infrared sensor.

Another aspect of the invention is a reactor for catalytic oxidation of ammonia, preferably for subsequent production of nitric acid, comprising a pressure vessel and a catalytic basket, said catalytic basket containing a catalyst suitable for oxidation of ammonia, the reactor being characterized by comprising at least one infrared sensor arranged to sense the temperature of said catalyst.

Preferred features are stated in the dependent claims.

Oxidation of ammonia takes place in the presence of oxygen, which means the oxidant can be any suitable oxidant, including for example air or enriched air or oxygen.

The catalyst is preferably a platinum catalyst or a platinum-rhodium catalyst. The catalyst is preferably in the form of a gauze.

In a preferred embodiment, said at least one infrared sensor is positioned away (distanced) from the catalyst. Accordingly, the sensor is not in a direct contact with the catalyst. More preferably, said sensor is not in a direct contact with the gaseous flow of ammonia and oxidant.

In a particularly preferred embodiment, said sensor is installed in a sight window of the pressure vessel of the reactor.

The sensor can point a specific region of the catalyst, for example a region of a catalytic gauze, to measure its temperature. According to yet another embodiment, the sensor can be switched between at least a first position wherein the sensor points a first region of the catalyst, and a second position wherein the sensor points a second region of the catalyst. As a consequence, the sensor can detect the temperature of different regions of catalyst. To this purpose the sensor can be mounted on a moving socket. In some embodiments the moving socket is part of the sensor, i.e. the sensor includes a built-in moving socket.

The above feature provides a moving sensor which can detect the temperature over certain areas of the catalyst allowing a control system to make a comparison between different regions of the catalyst. In normal operation, the temperature should be uniform. A different temperature of different regions of catalyst, above a predetermined threshold, can be interpreted as a deviation from normal operation, for example a contamination or degradation of the gauze and, in some embodiments, can be used to generate an alert signal.

According to preferred embodiments, a plurality of infrared sensors is used. Each sensor can be a fixed sensor or a moving sensor and, in the second case, each sensor can switch between at least two positions, pointing to different regions of the catalyst, in order to detect the temperature of the catalyst over a certain area.

The moving sensor or each moving sensors can target at least two regions of the catalyst. In a preferred embodiment, the or each moving sensor(s) is controlled to target a continuous region between two end points corresponding to end positions of the moving sensor.

Still another aspect of the invention is the retrofitting of an existing plant for production of the nitric acid. The reactor for oxidation of ammonia is retrofitted by installing at least one infrared sensor to detect the temperature of the catalyst.

Preferably, said at least one sensor is installed into an existing sight window of the pressure vessel. A sight window (also termed sight glass) is usually provided to look into the reactor and comprises for example a flange holding a suitable transparent cover, e.g. a glass cover. In a reactor for oxidation of ammonia, there can be one or more sight windows pointing to the catalytic gauze for checking the condition of the gauze itself. In such a case, the invention makes use of one or more of the available sight window(s) for the installation of one or more infrared sensor(s) to measure the temperature of the catalyst.

An aspect of the invention is also a method for monitoring the temperature of a catalyst in a reactor for oxidation of ammonia, characterized by monitoring the temperature of said catalyst by at least one contactless infrared sensor.

The invention also contemplates the use of the temperature signal of said at least one infrared sensor for controlling the process of ammonia oxidation and, more particularly, for determination of the ratio of ammonia to oxidant in the feed of the reactor.

The accurate and reliable detection of the temperature reached by the catalyst can be used, according to some embodiments of the invention, for a continuous adjustment of said ratio of ammonia to oxidant. Said oxidant is preferably air.

Accordingly, an aspect of the invention is a method for the production of nitric acid, comprising a step of oxidation of ammonia in the presence of a catalyst, comprising a step of monitoring the temperature of said catalyst by at least one contactless infrared sensor, wherein said step of oxidation is carried out with a ratio of ammonia to an oxidant which is continuously adjusted as a function of the temperature of the catalyst detected by said at least one contactless infrared sensor.

Still another aspect of the invention is a reactor wherein the temperature of the catalyst detected by said at least one contactless infrared sensor is used in a control system of the reactor for determining the ratio of ammonia to oxidant in the feed of the reactor.

The invention has the following advantages: easy installation, which is also possible from the outside of the vessel when the sensors are installed in the side holes; direct and reliable measure of the temperature of the catalyst; no contact with the process gas and no risk of corrosion failure; easy maintenance, simpler design of the tubes of the waste heat boiler which are no longer traversed by the thermowells. Embodiments with moving sensors have the additional advantage of improving the chance of detecting any deviation from normal operation of the catalyst.

Still another advantage of the invention is improved and more accurate control of the process, particularly by controlling the ratio of ammonia to oxidant in the reactor feed as a function of the temperature of the catalyst, that is the temperature of the ammonia-oxidant mixture (e.g. ammonia-air mixture), detected by the one or more infrared sensor.

The invention will now be elucidated with reference to a non-limitative example of preferred embodiments.

DETAILED DESCRIPTION

Figure 1:
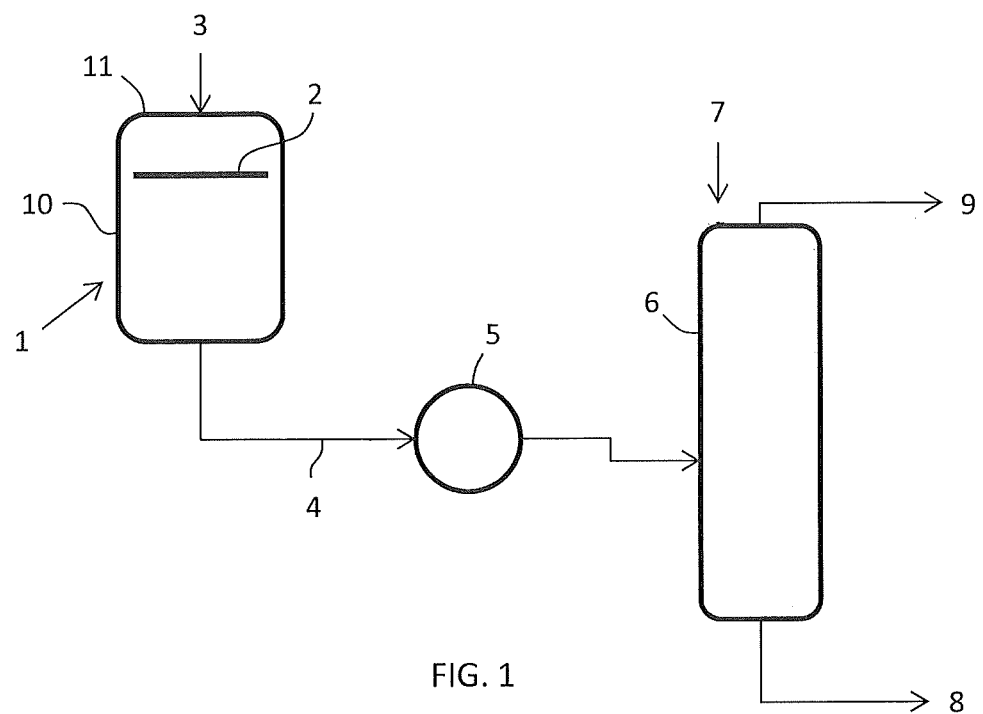
FIG. 1 is a simplified scheme of some items of a plant for the production of nitric acid.

FIG. 1 illustrates the basic steps of industrial production of nitric acid. A reactor 1 contains a gauze 2 of a Pt—Rh catalyst, suitable to catalyse oxidation of gaseous ammonia 3 in the presence of air. Said oxidation of ammonia in the reactor 1 produces a product gas 4 containing nitrogen oxides including NOx and $N_2O$. Said product gas 4, usually after heat recovery through a heat exchanger 5, is treated in a tower 6 where the oxides are absorbed by water 7, to form an aqueous solution 8 containing nitric acid and an overhead gas 9. Said solution 8 is further purified to obtain nitric acid and the gas 9 is usually treated in a De-NOx unit to remove nitrogen oxides; all the above follows known techniques which are not essential to this invention and are not described in detail.

Figure 2:
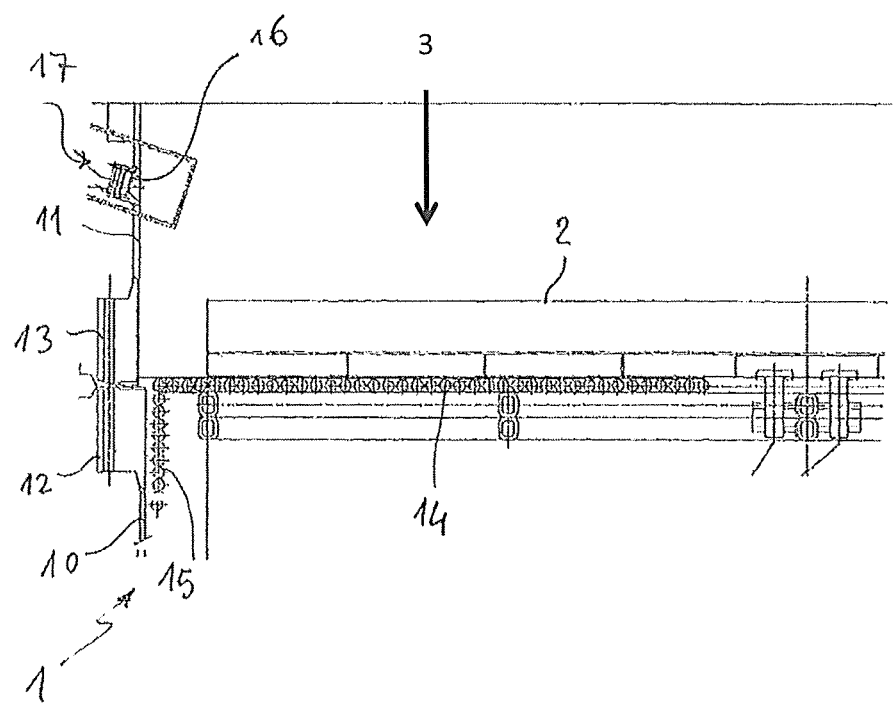
FIG. 2 is a detail of the ammonia oxidation reactor of FIG. 1, according to an embodiment of the invention.

FIG. 2 illustrates a detail of said reactor 1. The reactor 1 comprises a vessel 10 with a cover 11 held in place by flanges 12, 13. The reactor 1 contains the Pt—Rh catalyst gauze 2 and a basket 14 for Raschig rings and/or a secondary catalyst; the figure also shows tubes 15 of a waste heat boiler.

The reactor 1 comprises at least one infrared (IR) sensor 16 fitted in a sight window 17 of the pressure vessel 10. More particularly FIG. 2 illustrates a preferred embodiment wherein the sight window 17 is made on the cover 11. Said IR sensor 16 faces the gauze 2 and, hence, is able to sense the temperature of the catalyst.

Preferably, multiple IR sensors are provided in order to monitor the temperature over the gauze 2.

Even more preferably, the infrared sensor or each infrared sensor is mounted on a moving socket (e.g. a ball joint socket) so that the sensor can be oriented to target different regions (areas) of the gauze 2. For example, FIG. 3 illustrates an IR sensor 16 mounted on a moving socket 18 and illustrates a first position of the sensor 16 pointing to a first region 2' of the gauze 2, and a second position (dotted line) pointing to a second region 2" of said gauze.

According to some embodiments, the IR sensor 16 may include a built-in moving socket 18.

Figure 3:
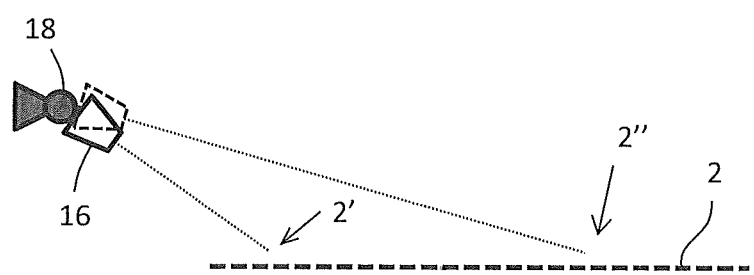
FIG. 3 illustrates a detail of a preferred embodiment of the invention.

Preferably a moving sensor 16 as in FIG. 3 is controlled to detect the temperature over a continuous region of the catalyst between two end position, for example between points 2' and 2" of FIG. 3.

The signal of the one or more infrared sensor(s) is sent to a monitoring and control system of the reactor or of a plant comprising the reactor. A deviation of the measured temperature from the expected value, or a non-uniform temperature over the gauze 2, may generate an alarm signal such as, for example, an alarm of contamination of the catalyst.

It shall be noted that the IR sensor 16 is positioned away from the gauze 2; nevertheless, it provides an accurate measure thanks to the infrared sensing. In addition, thanks to the installation in the sight window 17, the IR sensor 16 is in a protected position, being not directly exposed to the input flow 3, which reduces the risk of failure.

The sight window 17 is made with a known technique and can comprise, for example, a flange with a glass cover and a suitable gasket.

An aspect of the invention is the installation of one or more infrared sensor into existing sight windows of a pressure vessel. Accordingly, the reactor 1 can be retrofitted by adding one or more infrared sensors into available sight windows, such as the window 17, to monitor the temperature of the gauze 2. In some embodiments, existing temperature probes can be replaced by newly-installed IR sensors, or the new IR sensors may be in addition to conventional temperature probes.

According to preferred embodiments, the revamping can also comprise the implementation of a control of the ammonia to oxidant (typically ammonia to air) ratio in the feed of the reactor, as a function of the temperature detected by the IR sensor(s).

What is claimed is:

1. A method for the production of nitric acid, comprising a step of oxidation of ammonia in the presence of a catalyst, comprising a step of monitoring the temperature of said catalyst by at least one infrared sensor.

2. The method according to claim 1, wherein said catalyst is a platinum catalyst or a platinum-rhodium catalyst.

3. The method according to claim 2, said catalyst being in the form of a gauze.

4. The method according to claim 1, wherein:
said sensor is positioned away from the catalyst and the method comprising the step of switching said sensor between at least a first position wherein the sensor points a first region of the catalyst, and a second position wherein the sensor points a second region of the catalyst, so that the sensor can selectively detect the temperature of said first region and second region of catalyst.

5. The method according to claim 4 wherein: an alarm signal is generated when the temperature difference between different regions of catalyst exceeds a predetermined alarm threshold.

6. The method according to claim 1, wherein said step of oxidation is carried out with a ratio of ammonia to an oxidant which is continuously adjusted as a function of the temperature of the catalyst detected by said at least one infrared sensor.

7. The method according to claim 1, comprising the use of a plurality of infrared sensors to monitor the temperature of said catalyst.

* * * * *